Patented Feb. 20, 1934

1,947,626

UNITED STATES PATENT OFFICE 1,947,626

PREPARED RESIN

Charles A. Thomas, Dayton, Ohio, assignor, by mesne assignments, to Dayton Synthetic Chemicals, Inc., Dayton, Ohio, a corporation of Ohio No Drawing. Application September 15, 1930
Serial No. 482,157

6 Claims. (Cl. 260—2)

This invention relates to the manufacture of artificial or prepared resins.

One of the principal objects of this invention is to provide such a prepared resin of superior character and valuable properties and a method of preparing such a resin.

Another object of this invention is to provide such a prepared resin, produced from a diolefine and a substituted benzene.

Other objects and advantages of the invention will be apparent from the following description and appended claims.

In the practicing of this invention a diolefine is caused to react with a substituted benzene, such as an alkyl benzene, in the presence of a suitable catalyst, such as anhydrous aluminum chloride, to produce by polymerization a resinous reaction product adapted to commercial uses.

In carrying out this invention various diolefines may be used with various substituted benzenes. For example, very satisfactory results have been secured by using a diolefine, such as isoprene, with a substituted benzene such as toluene, or the xylenes or their homologues. Other substituted benzenes have been found to give good results, such as ortho, meta and para xylene, cymene (methyl isopropyl benzene), ethyl benzene, di-ethyl benzene, normal-propyl benzene and isopropyl benzene, tetra-methyl benzene, secondary butryl benzene, tertiary butyl benzene, amyl benzene, tertiary amyl benzene, hexamethyl benzene, hexa-ethyl benzene, styrene (vinyl benzene). Other diolefines may be used, such as the hexa-dienes, buta-diene and dimethyl buta-diene.

The proportions of the reacting materials may be varied widely. For example about the same yield of resin has been obtained from the use of one part isoprene to three parts of toluene, as from the use of three parts of isoprene to one part of toluene. The optimum yield of resin has usually been obtained by use of approximately equal proportions of diolefine and substituted benzene. Depending on the quality of resin desired the ratio of diolefine to substituted benzene may be varied widely. For example, if a resin having a high iodine number is desired, three parts of diolefine may be reacted with one part of substituted benzene. If a resin having a low iodine number is desired, one part of diolefine may be reacted with three parts of substituted benzene. Even wider variations in proportions of material may be used, the iodine number of the resulting resin appearing to increase or decrease in approximately direct proportion to the proportion of diolefine used.

As an example of the carrying of this invention into effect the following procedure is described using one part insoprene to one part toluene. A mixture of these hydrocarbons in approximately equal proportions by weight is placed within a suitable container or polymerizing vessel, and an activating compound such as powdered anhydrous aluminum chloride ($AlCl_3$) is added while the mixture in the vessel is being agitated. The aluminum chloride is preferably pulverized to give better contact, and is added in small quantities at a time while the contents of the polymerizing vessel are being agitated. For example, presuming that 25 gallons of a mixture of active ingredients are to be treated within the polymerizing vessel, aluminum chloride may be added in quantities of approximately 6 to 8 ounces at a time. With the addition of the first batch of aluminum chloride, there is a rather active chemical reaction with a resultant rise in temperature. It is desirable to control the temperature of the reaction inasmuch as this has a bearing upon the character of the resultant resin, particularly the hardness thereof. The reaction is preferably carried out above 20° C., as then the resultant resin is very materially harder and the yield is somewhat greater than when the reaction is carried out below 20° C. However, it is desirable where an atmospheric polymerizing vessel is used that the temperature should not be permitted to rise much above 40° C. Otherwise the polymerizing vessel should be kept under pressure to prevent undue volatilization and loss of resin. Polymerization at higher temperatures, such as above 65° C., requires a special pressure vessel. Very satisfactory results are secured when the temperature is controlled between 25° and 35° C., this being readily accomplished by introducing the aluminum chloride in small amounts with proper agitation to prevent local overheating and by cooling the reaction mass by a suitable cooling jacket. This polymerizing reaction is preferably carried out in the absence of water. Water present during the reaction hydrolyzes the catalyst to form an acid which in turn affects the reaction, resulting in a darker and quite different resin product.

Additional batches of aluminum chloride are added from time to time as may be done without unduly increasing the temperature of the reaction mass, and this is repeated with continuous agitation until no further temperature rise results. The amount of aluminum chloride used is also controlled in accordance with the materials being treated, as this is found to have a bearing upon the yield. It is found that the larger the volume of active ingredients being treated at any one time, the lesser the amount of catalyst needed per unit weight of active ingredients for optimum results. Thus when treating the above mixture in twenty-five gallon batches, very satisfactory results are secured by the addition of about three pounds of catalyst, this being equivalent to approximately 1.4 grams of catalyst for 100 cc. of active ingredients. Where smaller batches are being treated, such for example as a batch of 100 cc. an increased proportion of catalyst is used to give maximum yield, generally about 3.5 to 3.7 grams of aluminum chloride per 100 cc. of active ingredients giving optimum results. The quantity of catalyst needed for best results can be readily determined by tests for the particular ingredients being treated, so that this amount can be used in regular plant production. In any event, it is desirable that the amount of catalyst used be not increased materially over four grams per 100 cc. of active ingredients, as the character of the resultant resin may be deleteriously influenced.

In addition to aluminum chloride other compounds which hydrolyze in water giving an acid reaction will function satisfactorily to cause the conversion of the active ingredients into resin,—for example chlorides of iron, boron, zinc, antimony, indium, titanium and tin. The time of the treatment is also found to have a bearing upon the resultant resin, particularly the color. The reaction may proceed as much as 12 hours, but it is found desirable not to leave the catalyst in contact with the materials for a period of time much in excess of this, as the resin may be darkened. The reaction is preferably completed in less time, such as about 6 to 8 hours, this giving optimum results.

It has been found that the end of the polymerization reaction is indicated when the mixture has reached a constant density. This point is conveniently determined by making density determinations on samples of the polymerized mixture at half hour periods when the polymerization reaction is nearing completion. When the density is found to be constant at three successive periods, the polymerization reaction will usually be found to be complete. The reaction time for plant use may be readily determined in this manner on a trial run for specified materials and amounts.

The resulting reaction product is a viscous mass dark in color. This viscous material is then neutralized to terminate or kill the polymerizing reaction. Various water soluble alkalies may be used for this neutralizing, but preferably ammonia is employed as the excess of this material can be removed by distillation and has no injurious effects on the resulting resin. The neutralizing treatment is preferably carried out in the presence of an organic hydroxy compound, which is effective to supply hydroxyl radicals for the decomposition and precipitation of the aluminum chloride or other activating agent present. An alcohol, such as ethyl alcohol, functions very saticfactorily for this purpose. Thus a mixture of about 40% by volume of ammonium hydroxide containing 28% $NH_3$ by weight and 60% by volume of 95% ethyl alcohol gives good results. With the quantities specified above, slightly more than 3 gallons of this mixture is used, the amount theoretically required being approximately 3.2 gallons of the above mixture.

The mass is agitated constantly during the neutralization and a granular precipitate of the activating agent is produced which is readily removed by filtration—for example where aluminum chloride is used a precipitate of aluminum hydroxide is formed. The neutralization is accompanied by a color change, the reacting mass changing from a black or dark red to a yellowish red or yellow as the neutralization is completed. The neutralizing reaction is completed in about a half hour.

After the neutralizing reaction is completed the contents of the neutralizing vessel are preferably heated by means of a suitable temperature controlling jacket to a temperature of about 60° C.–80° C., or until the distillate comes over clear. That is, the distillation is continued till no more water comes over. For the amounts specified, this operation is continued 1–2 hours. During this heating substantially all the excess ammonia and alcohol is liberated and is allowed to pass off to a suitable condenser for the recovery of the distillate. From the distillate, ammonia and alcohol may be separated and recovered. In this process it is found desirable that substantially all of the water and $NH_3$ be removed to prevent precipitation of the resin and consequent clogging of the filter.

When the neutralization is carried out in the presence of water as described above, the subsequent distillation is more difficult and water may be occluded in the resin resulting in an opaque product. Where a clear resin is essential, or for more convenient plant operation, it may be desirable to carry out the neutralizing operation in the absence of water. In such case an anhydrous alcohol or other organic hydroxy liquid saturated with dry $NH_3$ gas can be used for the neutralization with very satisfactory results. When no aqueous solutions have been used, the above distillation can be carried out in less time than specified above.

When reacting a diolefine and a substituted benzene in this manner, it is found that two products are formed, one being an amorphous resin compound readily soluble in benzol, and another being a gelatinous compound insoluble in such solvent. This insoluble compound is carried down in the precipitate. In order to insure complete solution of the resinous product and to facilitate the filtering operation, an organic solvent which is immiscible with water, such as benzol, is added to the neutralized mass after free water and ammonia have been distilled off. In the distillation process approximately one half the volume of the original reaction mixture may be distilled off. The amount of solvent added is then approximately equal to the volume distilled off; that is, for the quantities specified about 12 gallons of benzol are added to the neutralized and distilled mass.

The neutralized mass mixed with benzol is then passed through a suitable filter, such as a conventional filter press, where the undissolved materials including the precipitated activating agent are removed from the liquid. The filtered sludge removed in the filter press is preferably treated to recover aluminum oxide ($Al_2O_3$) and ammonium chloride ($NH_4Cl$) as by-products. In place of the filter press a suitable type of centrifuge may be used if desired.

The clear filtrate containing the resin in solution is allowed to pass into a distillation vessel provided with a suitable heating jacket for the introduction of a heating medium such as steam or oil. The material within the distillation vessel is now heated to distill off the more volatile constituents, including benzol and any remaining alcohol, which may pass off to a suitable condenser so as to be recovered for repeated use in the process. Distillation is continued until a thermometer in the distillation line rises to approximately 100° C., at which time substantially all of the benzol and any remaining small amounts of alcohol and water, will have been driven off of the resulting resin which is left in the distillation vessel as a semi-fluid or pasty mass, termed herein a "soft resin". This soft resin contains varying proportions of higher oils, primarily unsaturated hydrocarbon oils of rather high molecular weight and perhaps some unreacted substituted benzene, which are not removed by distillation at temperatures not exceeding 100° C.

If desired, the concentration of the resin may be controlled so as to leave a calculated amount of solvent in the resin so that it is maintained in solution form. This solution may then be withdrawn to a convenient place of storage. The resin in solution form in benzol, or other solvent such as solvent naphtha, may be used directly in the paint and varnish industries, or for other suitable uses without concentration to dryness. If a solid or hard resin is desired, the distillation is continued as described above until substantially all of the readily volatile solvents and higher oils have been driven off.

It has been found that where a gas such as carbon dioxide, air, oxygen or the like is passed through the resinous mass, and kept well agitated, the heating jacket may be raised to a higher temperature of the order of 180° C. with a resultant rapid increase of the drying and hardening of the resin without injury to the resin. This may be readily accomplished by supplying oil heated to a temperature of about 180° C. to the external jacket, while a gas is being passed into the well agitated resinous mass. This treatment drives off the remaining solvent and higher oils present in the resin which tend to make it soft. When substantially pure materials are used, this hardening process is materially shortened, due to the fact that the higher oils which tend to make the resin soft are largely formed from impurities present in the starting materials. When it is desired to produce a hard resin having a substantially neutral reaction, a non-oxidizing gas, such as carbon dioxide, may be passed through the heated resinous mass.

By avoiding the use of steam or substantial quantities of water throughout the drying process, the occlusion of water in the resin is avoided and a clear product obtained. But steam distillation may be advantageously used if the occluded $H_2O$ makes no difference in the product, that is, when a clear resin is not desired. Means may be used to free this occluded $H_2O$ from the hardened resin, when it is desired to use a steam distillation in hardening the resin.

When the above described process has been carried to the desired degree, the resin is removed from the distilling and drying vessel and placed in suitable collecting troughs or shallow pans where it is allowed to cool and harden.

The resin produced from the reaction of isoprene with toluene in the manner described with the proportions specified, is clear, light in color and hard. This particular resin has been found to have an iodine number of about 115 and an acid number of 1.4, although as set forth above the iodine and acid numbers vary with variations in proportions and other factors. The resin produced in accordance with this invention is soluble in petroleum hydrocarbon solvents and is suitable for making coating materials, moulding compounds and for other useful purposes. Its light color makes it particularly adaptable for use with pigments.

Resins may be produced according to this invention by reacting with a substituted benzene a diolefine or a mixture of diolefines, or a diolefine or a mixture of diolefines dissolved in an inert hydrocarbon or a mixture of such hydrocarbons. Various substituted benzenes as stated above, may be used in these reactions. Such resins, as would be expected, have been found to vary widely in properties and physical characteristics. These resins vary in color from the light amber described above, to a cherry red, deep red, and reddish brown to dark reddish brown according to the starting materials used. Iodine numbers of these resins also have been found to vary widely; for example, a resin produced by reacting isoprene with ortho-xylene in equal proportions was found to have an iodine number of 87, while a resin produced by reacting isoprene with cymene (methyl-iso-propyl-benzene) in equal proportions, was found to have an iodine number of 144. The following table is given by way of illustrating examples of the carrying of this invention into effect in accordance with the process described above, and also illustrates the varying properties and characteristics of resins produced from different ingredients and also from different proportions of the same ingredients:—

| Materials and proportions used | Yield of resins g./100 cc. of active material taken | Iodine no. | Acid no. | Remarks |
|---|---|---|---|---|
| Toluene plus isoprene 1 — 1 | 16.4/100 cc. mix | 115.0 | 1.4 | Very light, extremely hard. Very fine. |
| Isoprene plus toluene 1 — 2 | 13.1/100 cc. mix | 80.8 | 0.8 | Very hard, brittle, clear amber yellow. |
| Isoprene plus toluene 1 — 3 | 12.3/100 cc. mix | 69.4 | 0.8 | Very hard, brittle, clear amber yellow. |
| Isoprene plus toluene 2 — 1 | 15.9/100 cc. mix | 96.1 | 1.0 | Very hard, brittle, clear amber yellow. |
| Isoprene plus toluene 3 — 1 | 15.0/100 cc. mix | 123.95 | 1.0 | Very hard, brittle, clear amber yellow. |
| Isoprene plus amyl benzene 1 — 1 | 25.0/100 cc. mix | 99.85 | 1.2 | Very hard and brittle, deep cherry red. |
| Isoprene plus amyl benzene 2 — 1 | 14.8/100 cc. mix | 103.05 | 1.6 | Very hard and brittle, deep cherry red. |
| o-xylene plus isoprene 1 — 1 | 33.3/100 cc. mix | 87.5 | 2.8 | Hard, clear, dark cherry red. |
| m-xylene plus isoprene 1 — 1 | 32.0/100 cc. mix | 87.5 | 2.4 | Hard, clear, dark cherry red. |
| p-xylene plus isoprene 1 — 1 | 20.8/100 cc. mix | 123.5 | 1.4 | Hard, brittle, clear yellow amber. |
| n-propyl benzene plus isoprene 1 — 1 | 17.0/100 cc. mix | 131.5 | 1.6 | Very light, extremely hard. Very fine. |

| Materials and proportions used | Yield of resins g./100 cc. of active material taken | Iodine no. | Acid no. | Remarks |
|---|---|---|---|---|
| iso-propyl benzene plus isoprene  1 — 1 | 16.1/100 cc. mix | 115.5 | 1.6 | Hard, brittle, amber yellow. |
| Cymene plus isoprene  1 — 1 | 18.7/100 cc. mix | 144.5 | 1.6 | Very hard, dark cherry red. |
| Ethyl benzene plus isoprene  1 — 1 | 17.4/100 cc. mix | 134.0 | 1.2 | Very hard, brownish amber. |
| Diethyl benzene plus isoprene  1 — 1 | 12.9/100 cc. mix | 109.5 | 1.2 | Very hard, clear and light. |
| Tetra-methyl benzene plus isoprene  1 — 1 | 25.4/100 cc. mix | 123.5 | 3.2 | Hard, clear, amber yellow. |
| sec-butyl benzene plus isoprene  1 — 1 | 23.6/100 cc. mix | 134.5 | 1.6 | Hard, clear, deep red. |
| Tertiary butyl benzene plus isoprene  1 — 1 | 21.4/100 cc. mix | 130.5 | 2.4 | Hard, clear, yellow amber. |
| Tertiary amyl benzene plus isoprene  1 — 1 | 14.0/100 cc. mix | 122.95 | 0.9 | Very hard, clear, brittle, amber yellow. |
| Hexamethyl benzene plus isoprene  1 — 1 | 16.6/100 cc. mix | 101.5 | 2.6 | Very hard, clear, brittle, deep cherry red. |
| Hexaethyl benzene plus isoprene  1 — 1 | 11.5/100 cc. mix | 86.5 | 1.0 | Very hard, clear, deep cherry red. |
| Styrene plus isoprene  1 — 1 | 43.0/100 cc. mix | 27.9 | 2.8 | Very hard, clear amber yellow. |

It has been found that certain of these resins have the unusual and valuable quality of combining with a drying oil such as linseed oil, Chinawood oil, etc., and castor oil, that is a chemical reaction takes place when these resins are heated to a high temperature of the order of 180° C. with a mixture of a drying oil and castor oil and a definite reaction product appears to be formed. Such resins having this quality were formed from the reaction of toluene and isoprene, of di-ethyl benzene and isoprene, of para xylene and isoprene, of iso-propyl benzene and isoprene, of secondary and of tertiary butyl benzene and isoprene, of hexa-methyl benzene and isoprene, and of hexa-ethyl benzene and isoprene. The property shown by these resins of reacting with a drying oil and castor oil is very valuable in the use of such resins for the manufacture of coating materials. The reaction product of castor oil and a drying oil with these resins, when used as a coating material, gives a film which is more elastic, more durable, more adhesive, and more impervious to water than films produced by the use of drying oils with other resins not having the property of combining with a drying oil and castor oil. A non-drying oil, such as castor oil, does not enter into combination with other generally used synthetic resins; and a satisfactory coating material is not formed by use of such other synthetic resins with castor oil in conjunction with the usual drying oils.

Such resins produced in accordance with this invention are particularly adapted for special uses according to the starting materials used, as for protective coating materials and for use in making useful and ornamental moulded articles. The materials best adapted for a particular use, or the most valuable application for the product of a material desired to be used, may readily be determined by experiment.

While the features herein described constitute preferred embodiments of this invention, it is to be understood that the invention is not limited to these precise features and that changes may be made therein without departing from the scope of the invention which is defined in the appended claims.

What is claimed is:

1. The substantially neutral resinous reaction product of a diolefine with an alkyl benzene in the presence of aluminum chloride, the resinous product being substantially free from halides and metallic compounds.

2. The substantially neutral resinous reaction product of a diolefine with toluene in the presence of a metallic halide catalyst, the resinous product being substantially free from halides and metallic compounds.

3. The substantially neutral resinous reaction product of a diolefine with a xylene in the presence of a metallic halide catalyst, the resinous product being substantially free from halides and metallic compounds.

4. A hard resin comprising the substantially neutral resinous reaction product of a diolefine with an alkyl benzene in the presence of a metallic halide catalyst, the heat-hardened reaction product being substantially free from unreacted material, halides and metallic compounds.

5. The method in the preparation of a synthetic resin which comprises reacting in the absence of water a diolefine with an alkyl benzene in the presence of a metallic halide catalyst, neutralizing the reaction product with an alkaline ammonium compound, separating the neutralized reaction product from the neutralized catalyst, and heating the separated reaction product to form a resinous material substantially free from catalyst.

6. The method in the preparation of a synthetic resin which comprises reacting in the absence of water a diolefine with an alkyl benzene in the presence of a metallic halide catalyst, neutralizing the reaction product, separating the neutralized reaction product from the neutralized catalyst and hardening the neutralized reaction product to form a solid resin substantially free from catalyst.

CHARLES A. THOMAS.